Feb. 14, 1961 W. C. WINTRODE 2,971,337
ELECTRONIC FUEL METERING SYSTEM FOR GAS TURBINE ENGINES
Filed Jan. 8, 1954 8 Sheets-Sheet 1

INVENTOR.
WARNER C. WINTRODE
BY
ATTORNEY

INVENTOR.
WARNER C. WINTRODE
BY
ATTORNEY

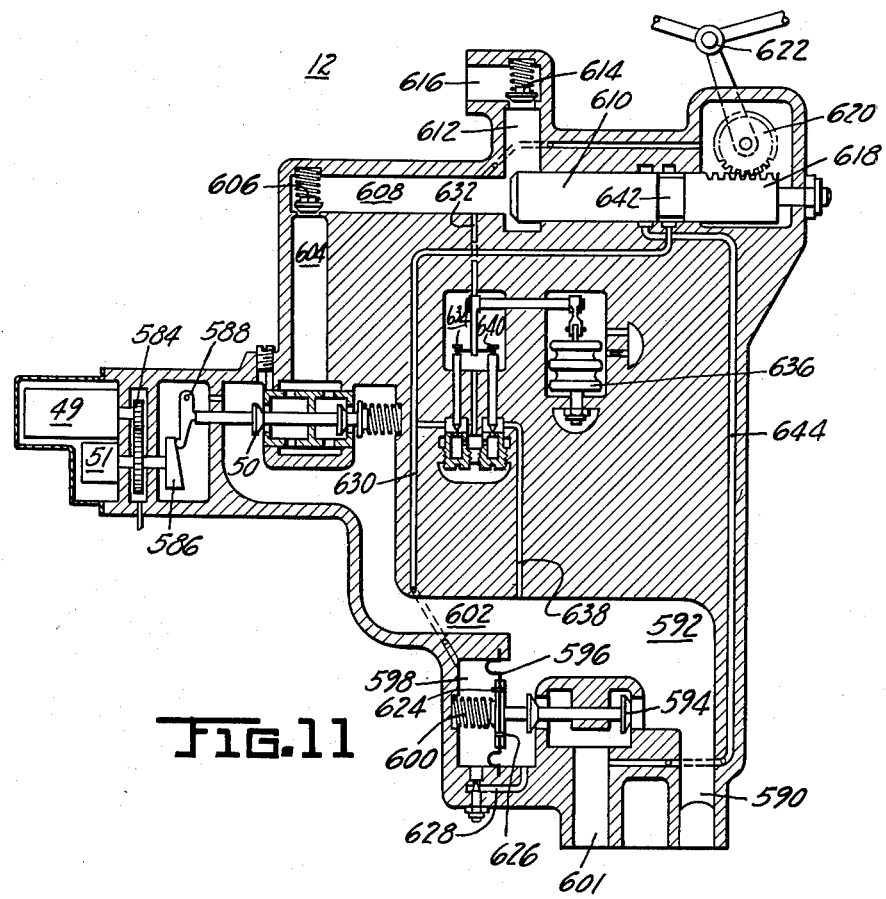

United States Patent Office 2,971,337
Patented Feb. 14, 1961

2,971,337

ELECTRONIC FUEL METERING SYSTEM FOR GAS TURBINE ENGINES

Warner C. Wintrode, South Bend, Ind., assignor to The Bendix Corporation, a corporation of Delaware Filed Jan. 8, 1954, Ser. No. 402,976

17 Claims. (Cl. 60—39.28)

This invention relates to gas turbine engines and more specifically to a fuel control system for gas turbine engines used in aircraft.

The latest types of gas turbine engines have performance characteristics which make it increasingly difficult to design mechanical compensating means which will act quickly enough to make necessary corrections in operating speeds, temperatures and pressures when the full potentialities of these engines are realized. The phenomenon known as compressor stall or surge, which at certain points in the operating range of the engine requires an immediate and drastic reduction in fuel flow, must be dealt with in such manner as to impose the smallest practical limitation on the acceleration characteristics. In addition to meeting the above requirements, the fuel control system must possess a high degree of inherent reliability.

It is, accordingly, an object of the present invention to produce a control system which is inherently more rapid in its response to engine operating variables than controls now in use.

It is another object of the present invention to produce a control system which allows the engine with which it is associated to approach very closely its maximum performance capabilities.

It is another object of the present invention to provide a control system in which the loss in acceleration due to compressor stall is at a minimum.

It is a further object to provide a control system which possesses a high degree of inherent reliability.

It is a further object to produce a control which accomplishes the above objects without undue size or weight.

Other objects and advantages will be apparent from the following specification taken in connection with the accompanying drawings in which:

Figure 11 shows the details of the main fuel valve and hydro-mechanical emergency system.

Figure 1:
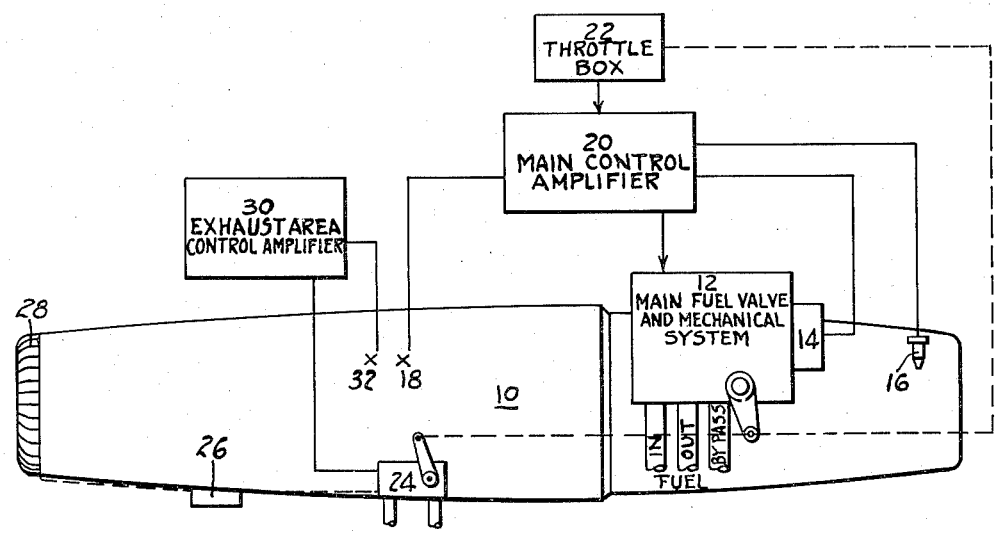
Figure 1 is a block diagram of my fuel control system showing the relationships of the major components.

Referring now to Figure 1, a gas turbine engine is shown generally at numeral 10. Supplying fuel to the turbine is a hydro-mechanical unit 12 which contains the main fuel valve and the emergency fuel system. Associated with unit 12 is a tachometer 14, which originates the speed signal. A resistance bulb 16 senses ambient temperature and a thermocouple 18 provides a suitable operating gas temperature signal which may be burner, turbine inlet, turbine outlet, or tailpipe temperature depending on the requirements of a particular application. The signals from tachometer 14, bulb 16, and thermocouple 18 are coordinated in a main control amplifier 20. It is the function of this amplifier to use these signals to control the position of the main fuel valve in unit 12. The throttle box 22 supplies a demand signal to main amplifier 20 and, through a linkage, to the hydromechanical system in unit 12. Also tied to the linkage is a hydraulic actuator 24 which operates a cylinder and piston assembly 26 which, in turn, operates the variable area exhaust nozzle 28. Excessive tailpipe temperatures occurring during a period when exhaust nozzle 28 is closed, or partly closed, are dealt with by means of an exhaust area control amplifier 30. This amplifier receives its temperature signal from thermocouple 32. A workable amplifier and actuating mechanism for this purpose is fully described in the copending application No. 454,348 of Peters et al. (common assignee). In this application a system is shown in which the exhaust nozzle is held in open position until the engine reaches a desired speed. At that speed point the exhaust area becomes variable through the pilot's control lever so that when maximum thrust is desired it will be readily available by simply reducing the exhaust area rather than waiting for the turbine to increase speed. The pilot's request is, of course, subject to a temperature override should tailpipe temperatures become excessive. The exhaust area control amplifier 30 will always automatically open the exhaust nozzle 28 should tailpipe temperatures exceed an established limit and will hold it open until the temperature reaches a safe value.

Figure 2:
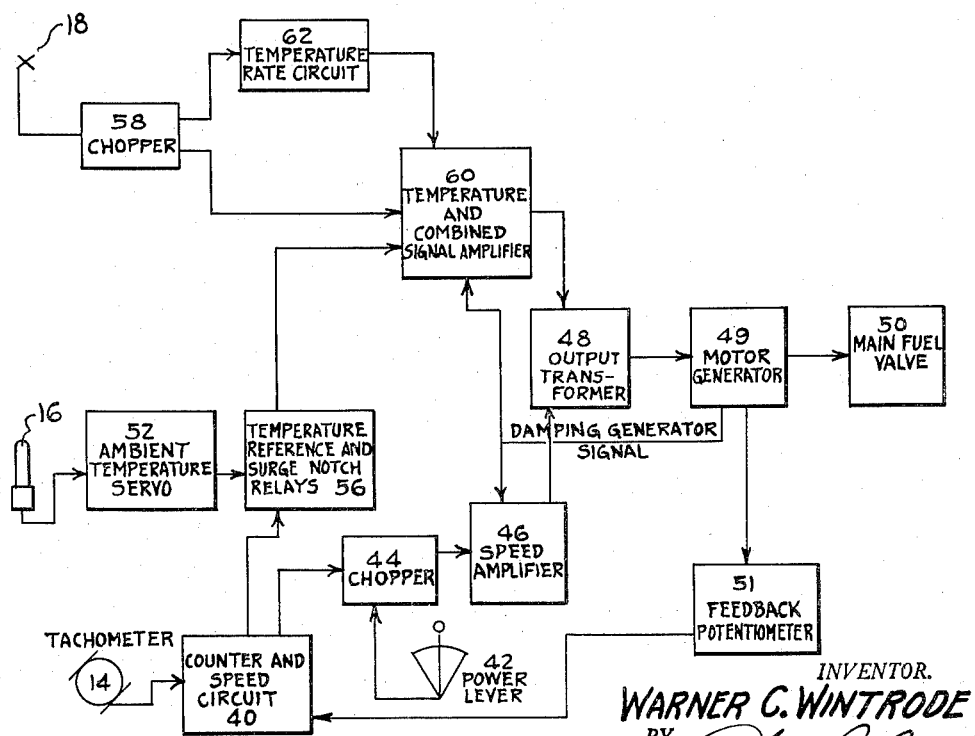
Figure 2 is a schematic block diagram showing the manner in which the various parts of the main amplifier are associated with the engine and its temperature and speed sensing elements.

In Figure 2 is shown in schematic block form, the components of the main amplifier 20 and its associated sensing members. Tachometer 14 which is driven by the engine 10 reflects an alternating current signal of frequency proportional to the engine rotational speed to the counter and rate circuit 40. The output of circuit 40 is a direct current voltage of magnitude proportional to turbine speed plus rate of change of speed. In the throttle box 22 the power lever 42 adjusts a potentiometer to establish a reference voltage which is compared with the speed signal from circuit 40 by modulator or chopper 44. The voltage resulting from this comparison, which is a speed error signal, is further amplified in a speed signal amplifier 46 which impresses the amplified speed error signal on a set of windings in a saturable transformer 48 which is used to drive a motor-generator 49. It is this motor which drives the main fuel valve 50 in hydro-mechanical unit 12, while the generator on the same shaft provides a damping signal used in units 46 and 60. Also driven by the motor is a feedback potentiometer 51. The speed of the engine 10 is established by the valve opening and is reflected by the tachometer thus closing the speed regulating loop.

Compressor inlet temperature is sensed by means of a resistance bulb 16 which, in conjunction with a temperature servo 52 serves to regulate the position of a plurality of potentiometers in the surge notching and temperature reference circuit 56. The operating gas temperature is sensed by thermocouple 18. This thermocouple voltage is fed to a modulator or chopper 58 which alternately switches the temperature signal to the temperature and combined signal amplifier 60 and to a temperature rate circuit 62. The temperature rate signal, which produces an anticipating effect, is then combined in amplifier 60 with the temperature signal and the temperature reference signal from circuit 56, the resultant voltage being developed across a set of windings in the saturable reactor 48. This temperature signal is capable of modifying or overriding the speed signal which, as previously indicated, is also supplied to the reactor.

Figure 3:
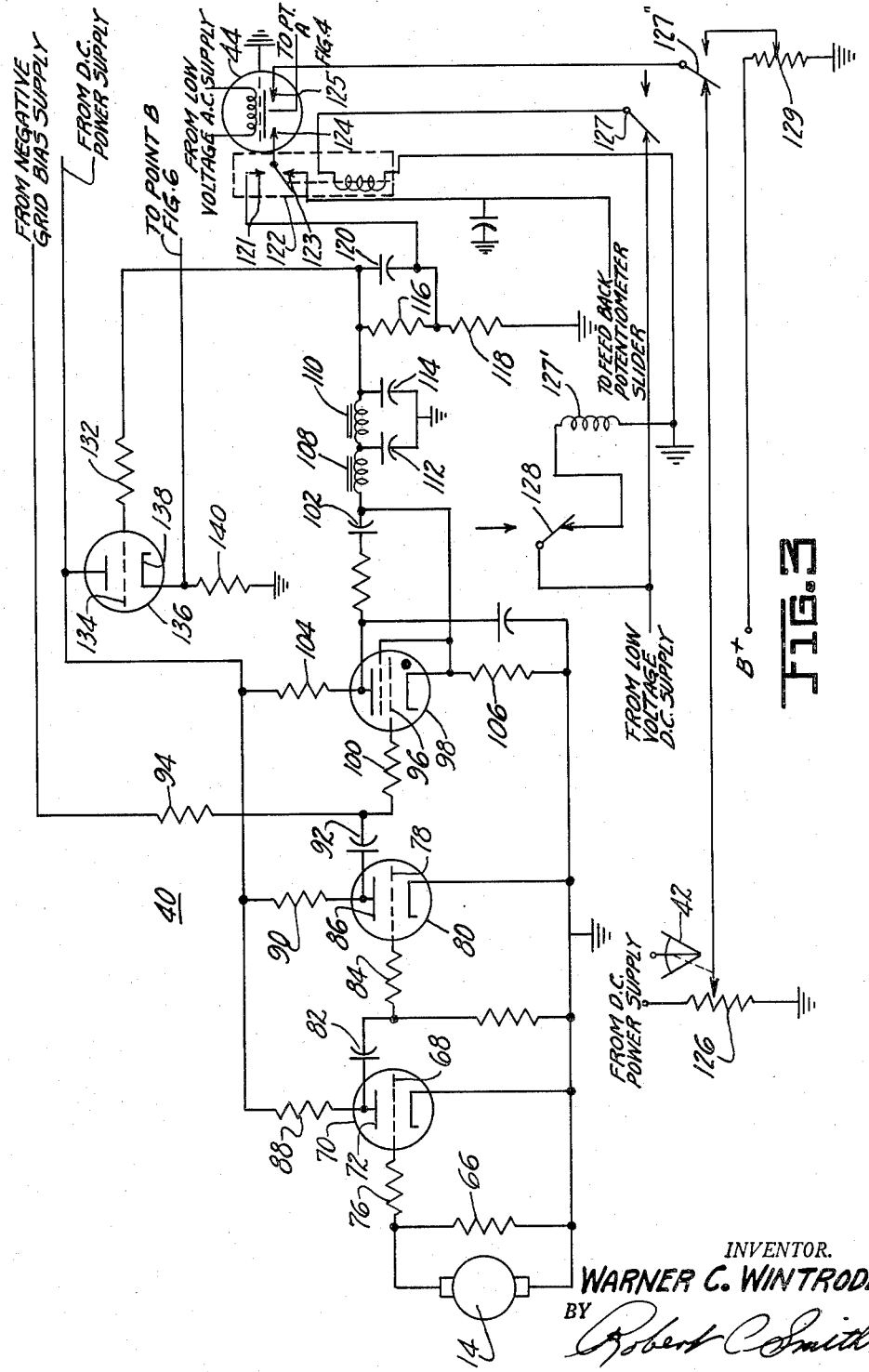
Figure 3 is a schematic diagram showing in detail the circuit which puts the tachometer speed signal in a form usable by the main amplifier.

The circuit which converts the output of tachometer 14 into a form usable by the main amplifier is shown at Figure 3. This circuit is essentially the same as that disclosed in the patent to Bartz et al. No. 2,793,327 (Common Assignee). The tachometer 14 generates an alternating current voltage across resistor 66, the frequency of which is directly proportional to the rotational speed of the turbine. This alternating current signal is impressed upon grid 68 of triode 70, which is one-half of a vacuum tube containing two triodes, and an amplification takes place. Because triode 70 is driven alternately between saturation and cut-off, a squared and limited sine wave appears at anode 72. Grid 68 is protected from drawing excessive current during the positive half cycle by grid limiting resistor 76.

The amplified signal appearing on anode 72 is coupled to grid 78 of triode 80 through condenser 82. The action of grid limiting resistor 84 corresponds to that of resistor 76. At anode 86 of triode 80 appears a voltage of square wave form varying in frequency with turbine speed. Numerals 88 and 90 represent standard anode resistors.

Condenser 92 and resistor 94 comprise a differentiating network across which the square wave signal from anode 86 is converted to alternating positive and negative pulsations of short duration. These pulsations are coupled to grid 96 of thyratron tube 98 by grid limiting resistor 100. The action of tube 98, which can be considered a counter tube is as follows: Just prior to the arrival of a positive pulse on grid 96, the tube 98 is held cut-off by the negative grid voltage from the power supply. Condenser 102 is charged to the anode power supply potential or B plus voltage and no current is flowing through either resistance 104 or resistance 106. When the positive pulse appears on the grid 96, the negative grid bias is overcome and the tube 98 ionizes, causing condenser 102 to discharge rapidly through tube 98 and resistor 104. The action of condenser 102 prevents the rapid decay of cathode voltage and thereby allows the grid to regain control of the tube. Condenser 102 then charges through resistor 106 to the power supply potential and the tube is once again in a quiescent state ready to accept the next positive pulse.

The average current through resistor 106 is directly proportional to the capacity of condenser 102, the power supply voltage, and the frequency of the firing pulses. Since E=IR, then the average voltage across resistor 106 is a function of the frequency and the power supply voltage when resistance 106 and capacitance 102 are held constant. With all circuit values except the frequency of pulsations across tube 98 held constant, the average voltage across resistor 106 becomes dependent upon the frequency of pulsations alone and hence, upon the rotational speed of the turbine 10. Inductance windings 108 and 110 and condensers 112 and 114 constitute an averaging filter, and across condenser 114 appears an average voltage proportional to turbine speed.

Resistors 116 and 118 and capacitor 120 comprise an output differentiating or phase lead network such that the voltage across resistor 118 contains components proportional to turbine speed and proportional also to the first derivative or rate of change of speed. This signal appears on contact 121 of relay 122. Contact 123 carries a signal from the feedback potentiometer 51 driven by valve motor 49; its function will be explained below.

This speed signal, upon leaving relay 122, is applied to contact 124 of chopper or modulator 44. On contact 125 appears a speed reference voltage established by the power lever 42 which actuates a slider on potentiometer 126. This modulator then alternately compares the two outputs, one a signal proportional to actual engine speed plus rate of change of speed, and the other a reference signal as established by the power lever. The resulting pulsating direct current voltage appearing on the movable contact of modulator 44 is a speed error signal reflecting the magnitude and direction of the difference in turbine speed from that set on the power lever. This error signal is then fed to point A of the speed amplifier circuit (Figure 4) which utilizes it and other signals to establish the desired turbine speed.

It will be noted that potentiometer 126 is supplied from the same power source as that which supplies the anode circuit of the counter, thyratron tube 98. Since counter output is proportional to its applied anode voltage, a change in anode voltage will be reflected both across resistor 118 and potentiometer 126. Because these two signals are compared through chopper 44, it follows that the system is self-compensating for changes in line voltage.

In addition to the output from chopper 44 this circuit has an output through resistor 132 to grid 134 of tube 136. The cathode 138 of tube 136 is maintained above ground voltage level by means of resistor 140. The anode being directly connected to the power supply, it will be seen that the speed signal is fed through a standard cathode follower output to the input of the next stage. This particular signal is supplied to point B of the acceleration scheduling circuit of Figure 6 and will be discussed in relation to that circuit.

Thus far, the speed circuit has been discussed only in relation to regular operation by the main control system. The function of contact 123 of relay 124, as previously mentioned, is to carry a signal from the feedback potentiometer 51 driven by motor-generator 50. This potentiometer supplies a signal which is at all times an indication of the position of the main metering valve in unit 12. Relay 122, then, supplies modulator 44 with either a speed signal from the counter circuit, or the feedback potentiometer signal. Energization or de-energization of relay 122 is controlled by a relay 127, actuated by energization of a winding 127' connected across a direct current source from the main power supply (not shown). Winding 127' becomes de-energized upon opening of the contact of relay 128. The winding controlling the actuation of relay 128 is found in the temperature amplifier of Figure 7 and its function will be discussed in detail below. At this point it will be assumed that relay 128 remains in the position shown, thus energizing winding 127' and closing the circuit through contacts 127 and the winding of relay 122. The movable contact of relay 122 is then held against terminal 123.

Referring now to modulator 44, contact 125 is shown connected through a relay 127" to potentiometer 126. Upon energization of winding 127' this relay assumes a position on the right terminal, thus applying the voltage across a potentiometer 129 to contact 125. Potentiometer 129 is manually positioned to provide a reference corresponding to a certain arbitrary opening of the main metering valve 50.

In operation, these various relays and potentiometers provide references for a starting circuit and for use during emergency operation. When the turbine is started relay 128 is in the position shown which energizes winding 127' thereby holding contacts 127 in the illustrated position. The winding of relay 122 is also energized and its movable contact is held against terminal 123, thus applying a signal from the feedback potentiometer to one side of modulator 44. On the other side of this modulator is a signal from potentiometer 129 which sets a reference point as previously discussed.

Figure 6:
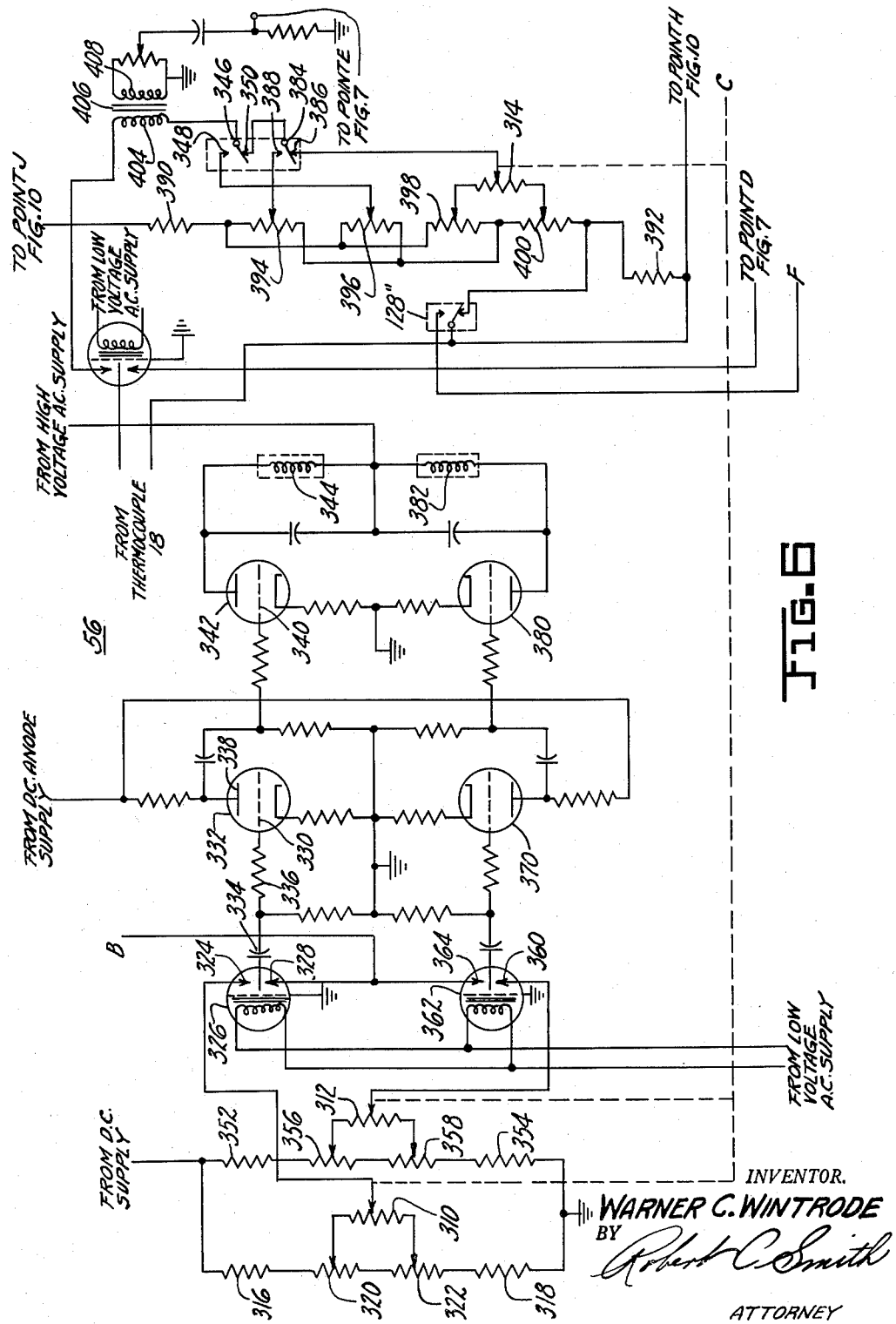
Figure 6 shows in detail the circuitry used in the surge scheduling system.

This signal is applied on contact 125 of modulator 44 through relay 127″ which is held against its right terminal by winding 127′. Modulator 44 thus compares a signal representative of actual valve opening appearing on contact 124 with an arbitrary reference established by potentiometer 129. This maintains the valve at a sufficiently open position to allow the turbine tailpipe temperature to increase rapidly until an operating temperature somewhat below the maximum allowable is reached, at which time a tube in the temperature circuit of Figure 7 conducts, thus energizing a winding 128′. This winding controls the simultaneous actuation of relays 128 (Figure 3) and 128″ (Figure 6). Relay 128 opens the circuit across winding 127′ thus de-energizing the winding of relay 122 and placing the tachometer signal on contact 124 of modulator 44. De-energization of winding 127′ also allows relay 127″ to move to the left, thus placing the power lever signal on contact 125 of modulator 44. This modulator is then comparing a speed signal from circuit 40 with a power lever reference signal established on potentiometer 126. Relay 128″ (Figure 6) simultaneously changes the temperature reference. This action will be explained in detail in connection with Figure 4. The control is at this time set for normal operation.

Figure 4:
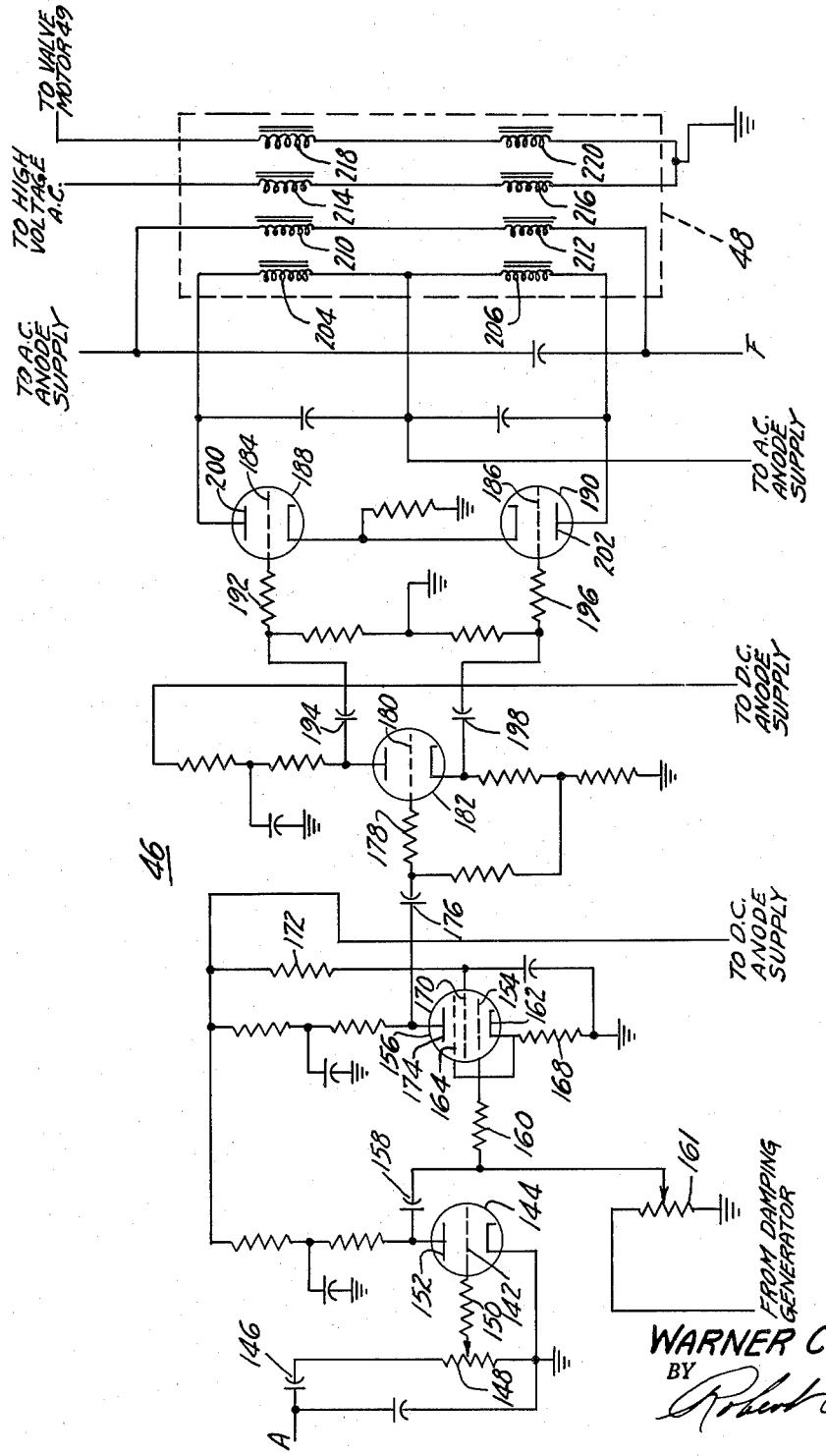
Figure 4 is a schematic diagram showing in detail the mixing and output stages of the main amplifier.

In Figure 4 is shown the circuit which serves as a speed signal amplifier, mixer, and main output stage for the system. At point A is introduced the pulsating direct current signal from counter and rate circuit 40 the magnitude of which is responsive to speed variations from a reference established by the throttle 42. This signal is introduced on the grid 142 of triode 144 where an amplification takes place. Capacitor 146 and resistor 148 serve as a resistance-capacitance input network, voltage discrepancies between the contacts of chopper 44 appearing as a square wave characteristic across resistor 148. This resistor is made variable to provide a means of gain control while resistor 150 prevents the flow of excessive grid current during the positive half cycle of triode 144. The amplified signal appearing on plate 152 of triode 144 is then fed to the control grid 154 of pentode 156. Capacitor 158 blocks any direct current component while resistor 160 keeps grid 154 from drawing excessive current. Also introduced into the circuit of grid 154 is a signal from the damping generator of unit 49. The magnitude of this damping signal is varied by means of potentiometer 161. Cathode 162 and suppressor grid 164 are biased slightly above ground by resistor 168 while screen grid 170 is held at a higher potential through resistor 172. The signal appearing at anode 174 of pentode 156 then flows through blocking capacitor 176 and grid current limiting resistor 178 to grid 180 of triode 182 which serves as a phase splitter. Alternate positive and negative pulsations appear on grids 184 and 186 of triodes 188 and 190 respectively with resistor 192 and capacitor 194, and resistor 196 and capacitor 198 performing a function similar to that performed by numerals 176 and 178. The voltage provided for anodes 200 and 202 being of the same phase relationship, current can flow in only one of tubes 188 and 190 at a time, the phase relationship of the grid signal being established at chopper 44 according to whether the engine at the particular moment is over or under the reference established by the power lever 42 at potentiometer 126. The signal current from one of these triodes is then impressed upon one or the other of two primary windings 204, 206 of saturable transformer 48, said windings being supplied from the same voltage source as are the corresponding anodes 200 and 202. Windings 210 and 212 and their associated reactors provide a means for introducing a temperature and temperature rate signal (developed in a part of the circuit discussed below) which is capable of overriding the speed signal should operating temperatures become excessive. In this respect it will be seen that the saturable transformer serves as a mixer to combine the speed and temperature factors in controlling the rotation of the motor-generator 49 and, hence, the movement of the main metering valve 50. Windings 204, 206, 210, and 212 then, are effectively direct current signal windings. The windings 214 and 216 are connected directly across the alternating current power supply to ground and windings 218 and 220 are connected to the variable phase winding of valve motor 49. The reactors shown are designed so that they are partially saturated under the regular alternating current power signal. When a signal appears on any of the control windings it causes its reactor to saturate, thus greatly reducing the impedance through the corresponding power windings. Because the power windings are directly connected from the power supply to ground, it follows that the total voltage drop across the two windings must necessarily equal the power supply voltage, and that if the impedance is reduced as measured across winding 214 for example, the voltage must necessarily rise across winding 216. Consequently, the voltage drop across winding 216 is greater than across winding 214 and this relationship is transmitted to the corresponding secondary winding. The voltage drop across winding 220 being greater than that across winding 218, a current flow is established imparting a rotational force in a particular direction to the valve motor 49.

Figure 5:
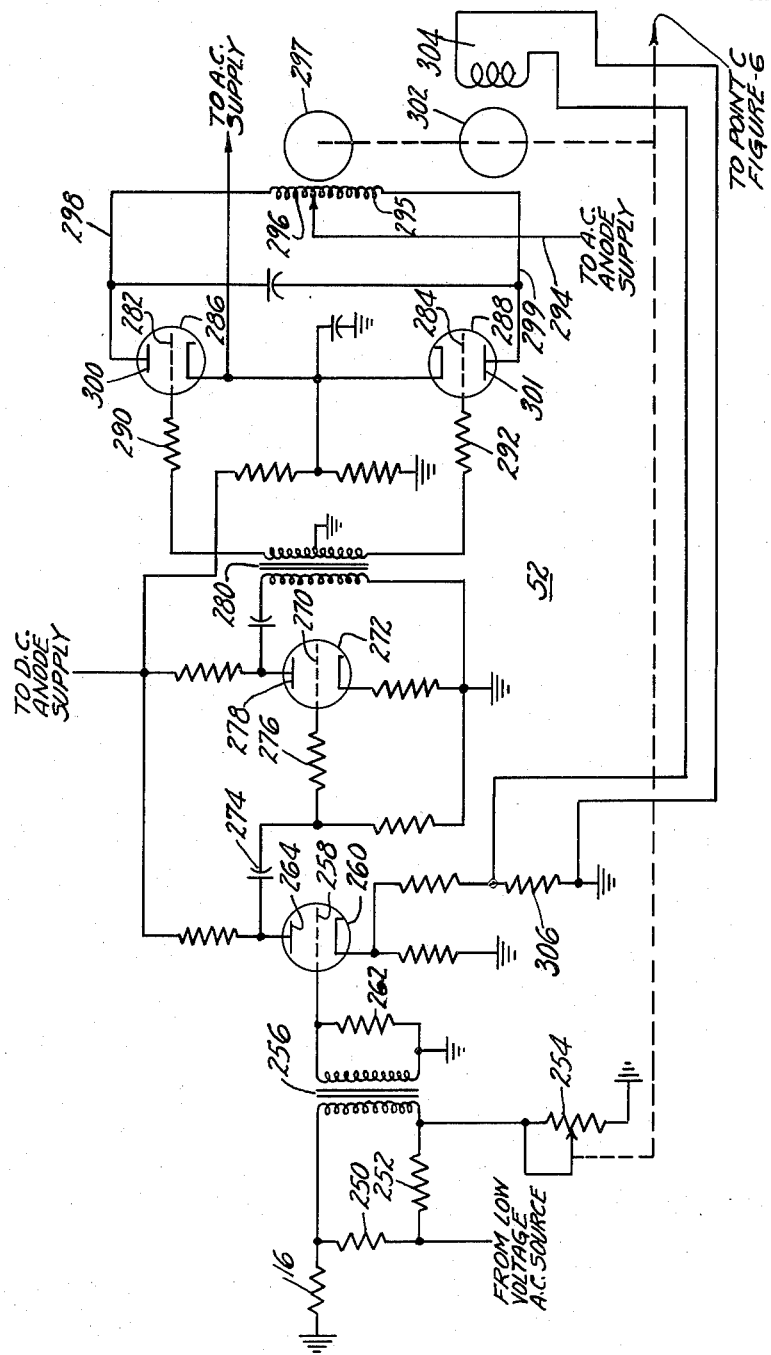
Figure 5 shows schematically the details of the compressor inlet temperature circuit.

On Figure 5 is shown the ambient temperature sensor and amplifier. This system is similar to that disclosed in the Patent No. 2,790,120 of George Ducoff (common assignee). In this system a resistance bulb 16 of a kind well known in the art and having a coefficient of resistivity varying with temperature is exposed to the temperature sensed and electrically incorporated as one branch of a resistance bridge circuit in which two of the branches are precision fixed resistors approximating zero temperature coefficient of resistivity 250, 252, and the fourth branch contains a precision potentiometer 254 of approaching zero temperature coefficient of resistivity. To minimize the effects of heating within the bridge, the power supplied to the bridge is a low voltage alternating current. The bridge is always balanced or tending to balance with the follow-up potentiometer 254 continually compensating for changes in the branch containing resistance bulb 16. When the bridge becomes unbalanced a voltage is developed across the primary of transformer 256 of a phase relationship dependent upon the direction of unbalance, i.e. upon whether the resistance of bulb 16 is below or above that required to balance the bridge. The signal appearing on the secondary of transformer 256 appears across resistor 262 and is impressed on the grid 258 of triode 260, where it is amplified. The amplified signal appearing at anode 264 is then impressed upon the grid 270 of triode 272 where it is further amplified. Capacitor 274 blocks direct current from flowing to grid 258 while resistor 276 prevents grid 258 from drawing excessive current. The amplified signal appearing at anode 278 is coupled through an interstage transformer 280 to the grids 282, 284 of two triodes 286, 288 respectively, which are arranged in inverse-parallel. Resistors 290 and 292 prevent the flow of excessive grid current. The anode voltage supply for these tubes comes in on a wire 294 and through the branches 295, 296 of a winding on a "plate-to-plate" motor 297, thence through leads 298 and 299 to anodes 300 and 301. This phase of the bridge output varies with the direction of unbalance, i.e. whether the resistance of the resistance bulb 16 is greater or less than that established on potentiometer 254. This output is applied to both of grids 282 and 284 but because of the phase relationship between the grid and anode voltages, only one of tubes 286 or 288 can conduct current at a time. In this manner is established which branch, 295 or 296, of the motor winding will be carrying current and hence, the direction of rotation of the motor 297. It will be noted that it is the rotation of this motor which causes follow-up potentiometer 254 to rebalance the bridge at different temperature levels. This motor also drives a shaft which is connected to point C of Figure 6 and to a generator 302 having a winding 304 in which appears a signal proportional to the speed of rotation of the motor and generator. This signal is connected across a resistor 306 in the cathode circuit of triode 260 where it provides a damping function.

With reference to Figure 6 it will be seen that point C indicates part of a mechanical linkage which drives potentiometers 310, 312, and 314. Also supplied to this circuit at point B is a signal from the speed amplifier of Figure 3. These two signals are combined to produce a means for scheduling the acceleration of the turbine around the compressor surge area which is graphically shown as a "surge notch" in the acceleration curve. The basic "surge notch" circuit is disclosed in the Patent No. 2,762,194 to Kunz et al. (common assignee). This acceleration characteristic is shown on the graph of Figure 8 where weight of fuel is plotted against engine rotational speed. Assuming 3000 r.p.m. as idle speed and 11,500 as a maximum, the curve M′ shows the weight of fuel required to run at any steady operating speed. Curve L′ shows the weight of fuel required to maintain 1350° F. at all operating speeds while curve K′ shows a corresponding 1650° F. curve. It will be noted that curve K′ intersects a shaded area which represents the compressor stall or surge area. Inasmuch as the engine cannot operate in this range for any significant time without the possibility of serious damage, it becomes necessary, if one is to achieve maximum acceleration, to devise some way of avoiding this stall area. In the present device, this is done by operating along the following schedule: At a pilot's request for maximum acceleration from idle speed, the control will allow fuel to enter the engine sufficient to raise the temperature from point $a$ on line M′ to point $b$ on line K′. The engine then gains speed along this curve until it approaches the stall area at point $c$ (and speed $N_1$). At this time fuel flow is reduced to produce an accelerating temperature at which the stall area is not encountered, shown at point $d$ on line L′. Acceleration continues along line L′ until point $e$ (speed $N_2$) is reached at which time the fuel flow is again increased sufficient to operate on the maximum temperature line K′, or some similar maximum temperature line, the stall area having been passed. Acceleration continues along the maximum temperature line to point $g$ at which time maximum speed is attained and the fuel flow is reduced from $g$ to $h$ which is sufficient to maintain the engine at the desired maximum speed.

Figure 8:
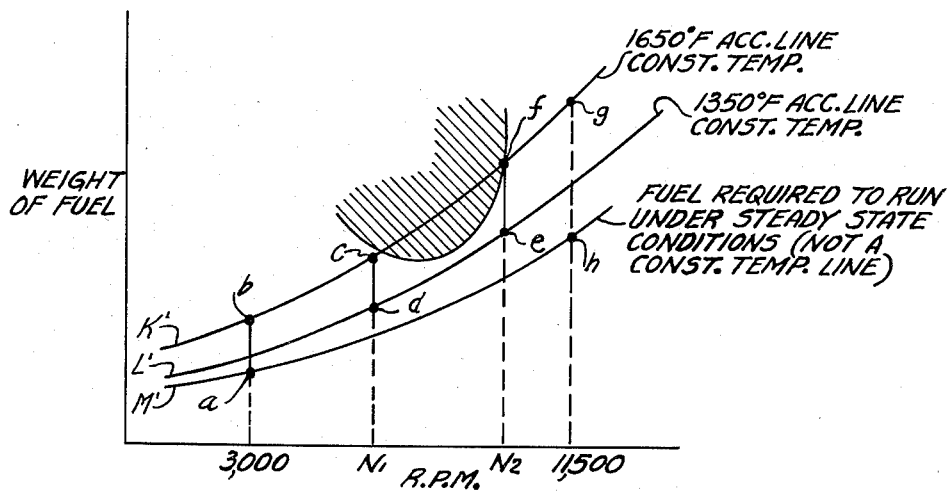
Figure 8 is a graph showing the manner in which the control schedules fuel during acceleration.
Figure 9:
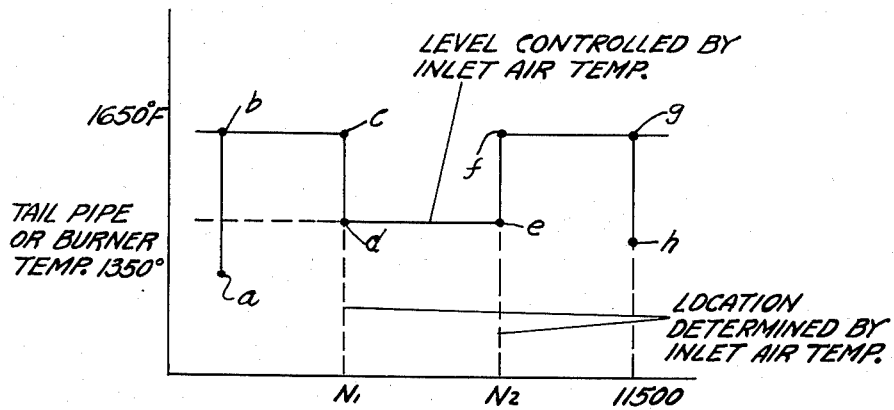
Figure 9 is a graph showing the manner in which temperature is varied with acceleration.

Figure 9 shows a graph plotting tailpipe or other suitable gas temperature against r.p.m. On this graph the points $a$ through $h$ have the same significance as in Figure 8 described above. At the pilot's request temperature immediately rises to maximum (in this case, 1650° F.) where it is maintained until speed $N_1$ is reached. At this time the speed is maintained while operating temperature drops to a lower value to avoid the stall area. Acceleration then continues at this lower temperature until speed point $N_2$ is reached. At speed $N_2$ where there is no further danger of entering stall, the temperature is again raised to a value which will achieve optimum acceleration. At maximum speed, temperature is reduced to the value required to maintain steady state operation. It will be noted that the operating temperature level from $b$ to $c$ is not necessarily the same as that from $f$ to $g$.

A further difficulty which has been encountered is that the surge or stall area changes its position with changes in ambient temperature. It is the function of the ambient temperature servo 52 to rotate potentiometers 310, 312, and 314 (Figure 6) in such manner as to shift this "surge notch" as required to meet ambient temperature changes. Potentiometer 310 changes the speed at which temperature is reduced from maximum to a point below the surge area ($N_1$), potentiometer 312 varies the speed at which the temperature is allowed to rise to maximum ($N_2$), while potentiometer 314 varies the temperature at which the engine operates in the "surge notch" (line $d$—$e$).

The theory of the "surge notch" circuit of Figure 6 is that an electrical signal is produced which is representative of a desired reference speed. This signal is bucked by a signal representing actual speed and the resultant signal is used to operate a relay changing the reference temperature when a certain operating speed is reached. It will be noted that resistors 316 and 318 and potentiometers 320, 322, and 310 are connected between a high voltage direct current source and ground. Potentiometers 320 and 322 are variable for the purpose of setting limits upon the speeds at which the operating temperature drop is to take place, while potentiometer 310 varies the speed point at which the first temperature change occurs with changes in ambient temperature. The voltage output from potentiometer 310 is applied to contact 324 of modulator or chopper 326. Contact 328 carries a signal proportional to actual rotating speed which is supplied to point B, having been established in the circuit of Figure 3. This modulator compares these two signals and the resultant appears on grid 330 of triode 332 where it is amplified. Capacitor 334 and resistor 336 block direct current components of the signal and prevent excessive grid current respectively. The amplified signal appearing on anode 338 of tube 332 is introduced on grid 340 of triode 342 where it may be further amplified. It will be noted that the anode supply for triode 342 is an alternating current voltage passing through coil 344 which operates a relay 346. The phase relationship between the signal on grid 340 and the anode of tube 342 are chosen so that no conduction will occur in the tube; no current will flow through coil 344; and hence, relay 346 will be held on contact 348 during the initial acceleration period, i.e. from point $b$ to point $c$ on Figure 8. As soon as the speed signal on contact 328 of chopper 326 exceeds the magnitude of the reference signal on contact 324, the resultant voltage is amplified in triode 332 and this amplified signal, which is in phase with the voltage on the anode of tube 342, is further amplified and flows through coil 344, thus moving the relay 346 to the position as illustrated on contact 350.

Resistors 352 and 354 and potentiometers 356, 358, and 312 are connected to the same voltage source as are resistors 316 and 318 and potentiometers 320, 322, and 310. Potentiometer 312 which, like potentiometer 310 is subject to adjustment by the ambient temperature servo, supplies a direct current reference signal to contact 360 of chopper 362. On contact 364 is the same direct current signal proportional to actual engine rotational speed which is supplied to contact 328 of chopper 326. The resultant of the signals appearing on contacts 360 and 364 is amplified through triodes 370 and 380 in the same manner as discussed in relation to triodes 332 and 342. When the speed signal from point B on contact 364 is larger than the reference signal on contact 360, the resultant of the signals supplied to chopper 362 is in phase with the anode voltage of tube 380 and current flows through coil 382 thus switching the movable contact of relay 384 from contact 386 to contact 388.

Resistors 390 and 392 and potentiometers 394, 396, 398, 400, and 314 comprise a voltage dividing network which establishes the operating temperature reference signal. Resistor 390 is of much higher value than any of the other resistances, so that the current output of the network is substantially constant. Potentiometers 394, 396, 398, and 400 being connected in parallel, any single potentiometer is capable of adjustment over the entire temperature range. It will be observed that relays 346 and 384 make it possible for one of several references to be used. The signal proportional to actual operating temperature is supplied from thermocouple 18 to the movable contact of chopper 58 where it is switched between the primary winding 404 of transformer 406 and point D of the temperature rate circuit of Figure 7. The signal supplied to winding 404 is arranged in bucking relationship with that supplied from the voltage dividing network so that any resultant signal, which is, of course, an indication of deviation from the reference temperature, appears on secondary winding 408 of transformer 406, and is supplied to point E of the temperature amplifying circuit of Figure 7. Potentiometer 410 provides a gain control.

As has been indicated, relay 346 is closed on contact 348 while the engine is accelerating to speed $N_1$ (Figures 8 and 9). During this time the reference voltage is high. At speed $N_1$, relay 346 is actuated against contact 350, as shown, and the reference voltage immediately hits a lower value as established by potentiometers 314 and 400. At speed $N_2$, relay 384 is actuated moving the contact from its normal or spring loaded position against contact 386 to contact 388. At this point the path of current flow is through potentiometer 394 which is set for a high reference voltage. The reference voltage being high, a correspondingly high thermocouple voltage must be supplied to primary winding 404 of transformer 406 to prevent an under-temperature signal appearing at potentiometer 410.

This temperature reference and "surge notch" circuit has a signal input from the counter and rate circuit of Figure 1 (at B) and a mechanical input from the ambient temperature servo of Figure 5 (at C). Chopper 58, which appears as a separate box on Figure 2, supplies an input to the temperature rate circuit of Figure 7 at point D and an input to transformer 406 of Figure 6. This input is combined with a reference voltage to produce a temperature error signal which, after being separated from any direct current component by capacitor 412, is applied to point E of Figure 7.

Figure 7:
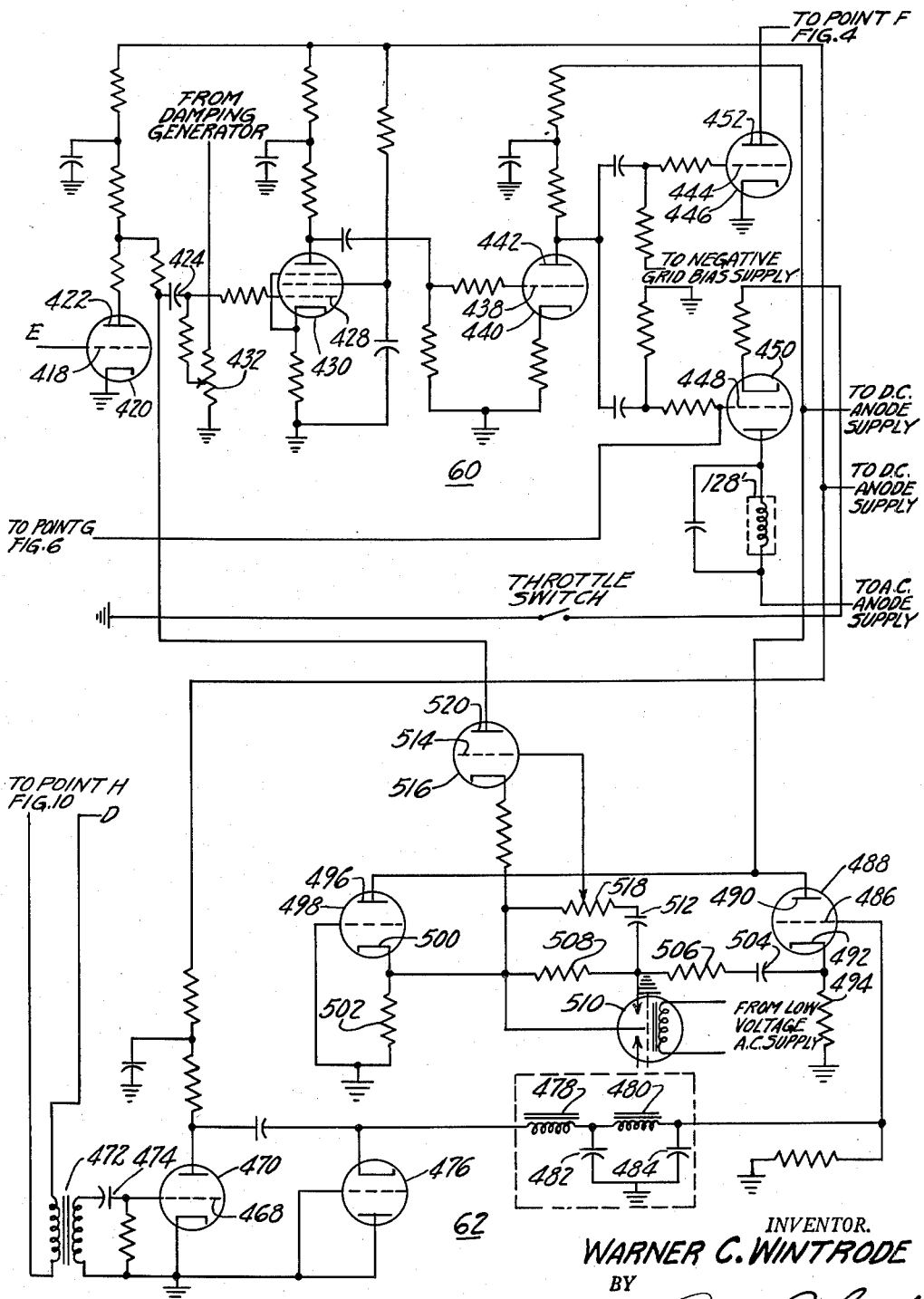
Figure 7 is a schematic diagram of the operating temperature and temperature rate circuits.

In Figure 7 are shown the temperature and combined signal amplifier 60 and the temperature rate circuit 62. At point E of amplifier 60 is introduced an alternating current temperature error signal which is applied to grid 418 of triode 420. An amplified signal appears on anode 422 which is combined with a temperature rate signal from circuit 62, passes across a coupling capacitor 424, and is further combined with a signal from the damping generator of unit 49 before being introduced on control grid 428 of pentode 430. To insure that the damping generator signal is maintained at a proper magnitude with respect to the combined temperature and temperature rate signals, it is introduced through a potentiometer 432. Pentode 430 and its associated components comprise a standard stage of amplification and this amplified combined signal appears on grid 438 of triode 440. Additional amplification takes place in this tube and the signal at anode 442 is applied on grid 444 of triode 446 and also on grid 448 of triode 450. Anode 452 of triode 446 is connected to point F of Figure 4. Reference to Figure 4 will show that anode 452 is supplied with an alternating current voltage from the power supply and that windings 210 and 212 of the output transformer 48 are connected to the same source and also to anode 452. This voltage, which is a temperature error signal, is impressed on windings 210 and 212, thereby making the output of transformer 48 responsive to temperature as well as speed.

The temperature rate circuit 62 of Figure 7 has supplied to it at point D a pulsating signal of magnitude proportional to operating temperature. The other side of the primary winding of transformer 472 is connected to the low voltage side of the "floating" power supply of Figure 10, but may, at this time, be considered as grounded. This signal is coupled to a grid 468 of a triode 470 through transformer 472. Any direct current component is prevented from reaching grid 468 by capacitor 474. The temperature signal is amplified in tube 470 and is rectified by means of tube 476, which is shown as a diode connected triode. A triode is used purely for the purpose of eliminating the necessity for an additional tube type. Inductances 478 and 480 and capacitances 482 and 484 comprise a filtering network the output of which is a smooth direct current voltage of magnitude proportional to temperature. This voltage is then introduced on the grid 486 of a triode 488. The anode 490 of tube 488 being connected to the direct current power supply and the cathode 492 being biased above ground by resistor 494, it will be seen that this tube represents a standard cathode follower output stage. Connected to the same power source as anode 490 is anode 496 of triode 498. The cathode 500 of this tube is also biased above ground by a resistor 502. Connected between cathode resistors 492 and 502 are a capacitor 504, a resistor 506, and a resistor 508. With the anodes 490 and 496 connected to the same power source, fluctuations in line voltage, which appear in the otherwise smooth direct current voltage across the cathode resistors, will be cancelled out across capacitor 504 and resistors 506 and 508. Capacitor 504 being unreceptive to a smooth direct current signal, only a change in the temperature signal will be reflected across resistors 506, 508, and 502. Resistor 508, which is of substantially larger value than either of resistors 506 or 502, has the substantial majority of the voltage resulting from temperature change developed across it. This direct current signal is converted into an alternating current of substantially square wave form by means of a chopper 510 and through a coupling capacitor 512 is impressed on grid 514 of triode 516. Potentiometer 518 provides a means of gain control for the temperature rate signal. It will be observed that during part of the cycle of chopper 510 the temperature rate signal across resistor 508 is short circuited. Because of this rapid change resistor 506 is inserted to keep the time constant across capacitor 504 of great enough duration to prevent complete discharge of the capacitor during each cycle. At anode 520 of triode 516 appears an amplified temperature rate signal which is combined with the temperature signal and the damping generator signal on the grid 428 of pentode 430. Inasmuch as the damping generator signal is adjustable at potentiometer 432 and the temperature rate signal is adjustable at potentiometer 518, the combined signal can be adjusted to achieve the desired degree of damping and anticipating effect.

Relays 128 (Figure 3) and 128" (Figure 6) are actuated when current flows through coil 128' (Figure 7) in the anode circuit of triode 450. These relays in conjunction with triode 450 and its associated circuitry including the throttle switch in the cathode circuit of tube 450 form part of the starting circuit discussed above, which prevents the turbine from being subjected to a hot start. It will be apparent from the foregoing that, unless some provision were made to protect the engine during starting, excessive amounts of fuel would be supplied because both the temperature and speed circuits would be signaling requests for more fuel. At the time the engine is started, relays 128 and 128" are in the normally unactuated position as shown and the throttle switch is open. When relay 128 is in this position, a signal from feedback potentiometer 51 is compared with an arbitrary voltage from potentiometer 129 thereby maintaining the main metering valve 50 at a position which would allow the turbine to gain temperature rapidly without, at any time, becoming subject to an excessive temperature which could cause damage.

The initial movement of the power lever 42 closes the throttle switch thereby making it possible for tube 450 to conduct if anode and grid voltages are in phase. Only an over-temperature signal is of proper phase relationship to cause conduction and to thereby cause current to flow in winding 128' sufficient to actuate relays 128 and 128". While in an unactuated position, relay 128" shorts out part of the temperature reference (across resistor 392), thus making it possible for an over-temperature signal to be reflected in transformer 406, and hence, on the grid 448 of triode 450, at an operating temperature several hundred degrees lower than the normal maximum. It will be remembered that until relay 128 is actuated, only a limited starting fuel flow is supplied to the engine. This amount is insufficient to allow the engine to achieve a normal maximum operating temperature within a reasonable length of time. For this reason relay 128″ lowers the temperature reference to allow the system to gain control of the main metering valve almost immediately after fuel ignition. When the thermocouple voltage exceeds the starting temperature reference voltage, the resultant is an over-temperature signal appearing on grid 448 of triode 450 in phase with the anode voltage and causing conduction through winding 128′. This actuates both relays 128 and 128″ thus switching the speed signal from speed circuit 40, the throttle signal from potentiometer 126, and raising the temperature reference voltage to a normal maximum value. To prevent under-temperature signals from de-energizing coil 128′ during regular operation, the grid 448 of triode 450 is connected through point G of Figure 10 to relay 128″ which is connected to the negative side of the thermocouple supply. In this manner grid voltage is maintained at a value which causes sufficient current to flow to keep coil 128′ energized. Once coil 128′ becomes energized by the starting over-temperature signal, it continues to be energized until the throttle switch in the cathode circuit of tube 450 is opened. This occurs only when the engine is shut off completely.

Figure 10:
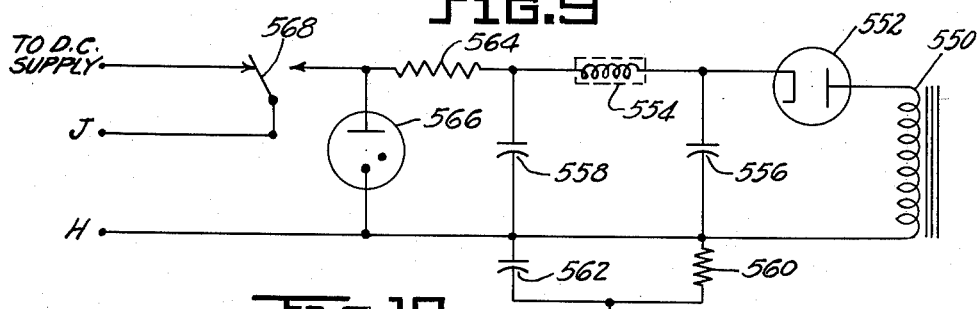
Figure 10 shows the floating power supply in the operating temperature circuit.

Referring now to Figure 10, a secondary winding 550 of the main power transformer supplies a voltage which is rectified in diode 552 and filtered by means of an inductance coil 554 and two capacitors 556 and 558. This smooth direct current voltage is biased above ground by means of a resistor 560 while a capacitor 562 by-passes undesired alternating current components to ground. This direct current voltage is then applied through a resistor 564 across a voltage regulator tube 566 the output of which is a closely regulated direct current voltage. Point H, which is connected to the cathode of tube 566 is connected to the low voltage sides of the reference temperature network of Figure 6 and the input transformer 472 of the temperature rate circuit of Figure 7, while point J is connected to the high voltage side of the temperature network. Thus a closely regulated direct current voltage is applied across this network which is maintained above ground level or "floating."

Coil 554, in addition to being part of a filter network, also actuates a relay 568. This relay is in the position shown when coil 554 is de-energized, which occurs either while diode 552 is warming up or upon failure of this tube or other parts of this portion of the power supply. Under normal operation, as soon as tube 552 is warmed up, current flows through coil 554, and relay 568 is switched to the position through point H. Should a failure of this power supply occur during operation, a direct current power supply will be connected across the temperature reference network which is of the same order of magnitude although not so precisely regulated. This source will supply a workable reference signal for emergency operation.

Figure 11 shows the construction of the hydromechanical unit 12 in which is housed the motor-generator 49, the rotation of which is governed by the output transformer 48 and which drives the main metering valve 50 through gear train 584, cam 586, and cam follower 588. Also driven through gear train 584 is a feedback potentiometer 51 which provides a reference signal for the starting circuit. Fuel is supplied under pressure by a pump (not shown) to fuel inlet 590 entering a chamber 592 in which the pressure is maintained at the desired value by a by-pass valve 594 controlled by a diaphragm 596 subjected on one side to fuel inlet pressure and on the other side to the fluid pressure in a chamber 598 and the force of a spring 600. Fuel by-passing valve 594 returns to the inlet side of the pump by way of conduit 601. Immediately downstream from chamber 592 is a passage 602 which carries the fuel to the main metering valve 50. After passing through this valve, the fuel flows through a passage 604 and a check valve 606, into a passage 608, through a cut-off valve 610 into passage 612, through a pressurizing valve 614 and to the engine fuel manifold from outlet 616. The cut-off valve member 610, which has a rack 618 formed on its surface, is actuated by a gear 620 directly driven by a power lever linkage 622 and, when moved to its extreme left hand position, cuts off the flow of fuel to passage 612.

By-pass valve 594 and diaphragm 596 cooperate to maintain the desired pressure drop across the main metering valve 50. Chamber 598 communicates with chamber 592 through passages 624, 626, and 628; and with passage 603 on the downstream side of the metering valve through conduits 630 and 632. Located between conduits 630 and 632 is a control valve 634 which is actuated by a bellows 636. This bellows is exposed to compressor inlet pressure and through valve 634 provides a means for varying fuel flow with changes in entering air density. For any fixed position of valve 634 a constant pressure differential between chamber 592 and passage 608 is maintained by diaphragm 596. The fluid in passage 602 upstream of metering valve 50 obviously has substantially the same pressure as that in chamber 592; and because check valve 606 provides very little resistance to the flow of fuel in the normal direction, the pressure in passage 608 is essentially the same as that immediately downstream from the metering valve. Therefore the pressure drop across diaphragm 596 plus the pressure drop introduced by the valve 634 effectively equals that across the main metering valve 50.

A provision is made for insuring a substantial minimum flow as needed during starting of the engine and to prevent flame die-out during operation. A conduit 638, which communicates with chamber 592, is connected through a valve 640 and conduit 632 to passage 608. Valve 640 is connected to bellows 636 in the same manner as is valve 634 and hence is also responsive to changes in compressor inlet pressure. The flow across valve 640 is assured by the pressure drop between chamber 592 and passage 608. The contour of the valve 640 is determined by the operating characteristics of the particular engine, and is chosen to provide a minimum fuel flow which will produce a suitable minimum engine speed under various altitude conditions. It will be observed that the flow across valve 640 is supplementary to that across valve 634.

Referring again to cut-off valve member 610, it will be observed that it carries an annular indentation 642 which communicates with chamber 598 by means of passage 632. If valve 610 is moved toward the left to full cut-off position, this indentation 642 will provide a means of communication from chamber 598 to by-pass conduit 599 through passage 632, indentation 642, and passage 644. In this manner the pressures within the system are kept at comparatively low values even though cut-off valve 610 is closed suddenly in the face of full pump pressure. The release of the comparatively high pressure in chamber 630 allows diaphragm 596 to move to the left carrying regulator by-pass valve 594 to its maximum open position. Thus the fuel is easily by-passed with very little pressure fluctuation.

*Operation*

At the time the engine is started, the speed signal from circuit 40 is disconnected from the speed amplifier 46 by means of relay 122, the movable contact of which is against terminal 123 communicating with the slider on feedback potentiometer 51. Opposing this signal is an arbitrary reference established by potentiometer 129, the two signals being compared by chopper 44. Potentiometer 129 provides a reference voltage which allows the main metering valve 50 to remain open an amount sufficient to allow the engine to heat rapidly without danger of "hot starts." At this time relay 128 is in its normally closed position while relay 128" (Figure 6) is held against its lower terminal thereby removing from the circuit a portion of the resistance across which the temperature reference is established. As the temperature in the engine increases, a point is reached at which the low starting temperature reference gives an over-temperature signal to the main temperature amplifier 60, at which time tube 450 (Figure 7) conducts, thereby energizing coil 128'. As this coil is energized, relays 128 and 128" both take new positions, the latter against its upper terminal thereby placing the full temperature reference voltage into the circuit, and relay 128 opening the circuit through coil 127' thus opening relay 127 which de-energizes relay 122, and also switching relay 127" from the arbitrary reference established by potentiometer 129 to the throttle reference established on potentiometer 126. At this point the engine is ready to be governed by the regular speed amplifier which supplies the signal to terminal 121 of relay 122 and the throttle reference, which signal is supplied on terminal 125 of chopper 44. As the full temperature reference voltage is now in the circuit an over-temperature signal is no longer present in the amplifier and the temperature reference will thus call for a higher temperature and hence, an increased fuel flow. Fuel input continues to rise until the maximum temperature line is achieved, in this case the 1650° F. acceleration line which appears on Figures 8 and 9. With reference to these figures the engine is now operating at point b. The engine now accelerates from point b to point c on the 1650° F. acceleration line, the temperature amplifier providing the only limiting function. It will be remembered that an actual speed signal is supplied from speed amplifier 40 through point B on Figure 6 to the surge-notching circuit 56. When the engine reaches point c on the 1650° F. acceleration line of Figure 8 the speed signal supplied from amplifier 40 becomes of such phase and magnitude as to cause tube 342 to conduct, thereby energizing coil 344 and placing the movable contact of relay 346 against terminal 348. The temperature reference is then immediately reduced to a lower value, in this case 1350° F. Fuel flow is reduced until the engine reaches point d. Acceleration then continues along this lower temperature line until point e is reached, at which time the speed signal from circuit 40 appears on contact 364 of modulator or chopper 362 in such phase and magnitude as to cause tube 380 to conduct, thereby energizing coil 382. The energization of coil 382 immediately puts into the temperature circuit a new reference which may be the 1650° F. acceleration line, or may be some other value higher than 1350° F. which is considered to be a desirable temperature limit during the operation from speed $N_2$ to the maximum speed achieved at point g. The maximum speed having been reached, the speed amplifier then calls for reduced fuel flow to the point sufficient to support steady state operation at the maximum speed which occurs at point h on the graph of Figure 8.

It will be remembered that at all times during the operation of the turbine the ambient temperature servo of Figure 5 is in operation. It is the function of this servo to change the speed and temperature references establishing the surge notch with changes in ambient temperature conditions.

The exhaust area control amplifier 30, in conjunction with its associated components provides a means for securing greatly increased thrust within allowable speed and temperature limitations. This control automatically maintains the exhaust nozzle at maximum area at power lever positions and engine speeds below a predetermined value; and at power lever positions and engine speeds above such value and at tailpipe temperatures below a predetermined value, the exhaust jet area will vary in response to the adjustment of said lever; and should the tailpipe temperature rise beyond the set or predetermined temperature with the exhaust nozzle at any area less than maximum, the power lever control will be overridden and the exhaust area will be automatically increased until the tailpipe temperature is maintained at its set value. Should operational conditions produce unsafe tailpipe temperatures, the power lever control will again be overridden and the nozzle area will vary as a function of tailpipe temperature only.

Various modifications will be apparent to those skilled in the art; i.e., different engine configurations may require that additional or different operating parameters be controlled such as compressor discharge pressure and/or temperature, and where an afterburner is used it may be necessary to sense and control fuel flow with variations in afterburner pressure. It is also possible that additional feedback functions may be employed to insure stability, especially where other control parameters are used. And, obviously, some of the operations performed electrically in the present control may be performed by mechanical or hydraulic means. These and other modifications may be employed without departing from the scope of the invention.

I claim:

1. A coordinated fuel control system for a gas turbine engine having a fuel conduit and a valve in said conduit comprising an electrical main control unit, a mechanical unit, and an exhaust area control: said main control unit including a first amplifier constituted to have two sources of input signals, one of which reflects actual engine rotational speed, the other of which reflects selected rotational speed, said actual and selected speed signals being used in said amplifier in a manner such that the output of said amplifier varies in magnitude with the magnitude of the difference between said actual and selected speed signals and the polarity of said output is dependent upon whether said actual speed signal is over or under said selected speed signal, and a second amplifier including means for producing a plurality of temperature reference signals and having two sources of input signals for selecting a desired temperature reference, one of which reflects ambient temperature, and another which reflects actual engine rotational speed, and having a third input signal reflecting actual engine operating temperature, said desired temperature reference signal and said actual temperature signal being used in said second amplifier in such a manner that the output of said second amplifier varies in magnitude with the magnitude of the difference between said desired temperature reference signal and said actual temperature signal, and in polarity with whether said actual temperature signal is over or under said desired temperature reference signal, means producing a signal varying with rate of change of actual engine operating temperature and combining said rate signal with said temperature error signal in said second amplifier, a combining amplifier for receiving the output signals from said first and second amplifiers and producing an output signal of its own having a magnitude which varies in accordance with the amplitude and phase of said combined signals; said mechanical unit including a motor driven by the output of said combining amplifier for varying the position of said valve, and means for varying the head across said metering valve with changes in entering air density; and said exhaust area control including a temperature limiter system, a hydraulic actuator operated by said throttle and subject to an overriding signal from said temperature limiter, and means movable by said actuator for varying the exhaust area.

2. A mechanism for controlling the fuel supplied to a gas turbine engine comprising a fuel conduit, a metering valve in said conduit, and means for controlling said valve including a first amplifier constituted to have two sources of input signals, one of which reflects actual engine rotational speed, the other of which reflects selected rotational speed, said actual and selected speed signals being used in said amplifier in a manner such that the output of said amplifier varies in magnitude with the magnitude of the difference between said actual and selected speed signals and the polarity of said output is dependent upon whether said actual speed signal is over or under said selected speed signal; and a second amplifier including means for producing a plurality of temperature reference signals and having two sources of input signals for selecting a desired temperature reference, one of which reflects ambient temperature, and another which reflects actual engine rotational speed, and having a third input signal reflecting actual engine operating temperature, said desired temperature reference signal and said actual temperature signal being used in said second amplifier in such a manner that the output of said second amplifier varies in magnitude with the magnitude of the difference between said desired temperature reference signal and said actual temperature signal, and in polarity with the direction of temperature error, means producing a signal varying with rate of change of actual engine operating temperature and combining said rate signal with said temperature error signal in said second amplifier; a combining amplifier for receiving the output signals from said first and second amplifiers and producing an output signal of its own having a magnitude which varies in accordance with the amplitude and phase of said combined signal; and a motor driven by the output of said combining amplifier for positioning said metering valve.

3. In a fuel control system for a gas turbine engine having a fuel conduit and a metering valve in said conduit, means for positioning said metering valve comprising a tachometer for producing a signal varying with turbine rotational speed, a speed error circuit producing an electrical signal proportional to the difference between a desired and an actual turbine rotational speed, a temperature bridge circuit producing a signal reflecting ambient temperature conditions, a thermocouple for producing an electrical signal proportional to actual operating temperature, means for producing a plurality of electrical reference signals some of which are variable, a motor driven by said temperature bridge circuit for varying said variable reference signals, means responsive to said speed circuit for selecting a desired reference signal, means for producing a temperature error signal by comparing said reference signal with the signal from said thermocouple, a circuit for producing a signal proportional to rate of change of actual operating temperature, a temperature amplifier in which said rate signal and said temperature error signal are combined and amplified, a saturable transformer in which said speed error and temperature amplifier signals are combined, and a motor powered by said transformer for controlling the position of said fuel valve.

4. A fuel control system as set forth in claim 3, wherein said saturable transformer comprises a first pair of windings in which said speed error signal is applied, a second pair of windings in which said temperature error signal is applied, a third pair of windings connected to an alternating current power source, and a fourth pair of windings carrying an output signal from said transformer.

5. In a fuel control system for a gas turbine engine having a fuel conduit and a metering valve in said conduit, means for controlling said valve including a speed error circuit producing an electrical signal proportional to the difference between a desired and an actual turbine rotational speed, means having an output reflecting ambient temperature conditions, a temperature sensing device for producing an electrical signal proportional to actual operating temperature, means for producing a plurality of electrical reference signals some of which are variable, a motor driven by said ambient temperature responsive means for varying said variable reference signals, means responsive to said speed circuit for selecting a desired reference signal, means for producing a temperature error signal by comparing said desired reference signal with the signal from said temperature sensing device, a circuit for producing a signal proportional to rate of change of actual operating temperature, a temperature amplifier in which said rate signal and said temperature error signal are combined and amplified, a saturable transformer in which said speed error and temperature amplifier signals are combined, and electrical means powered by said transformer connected to said fuel valve.

6. A fuel control system as set forth in claim 5, wherein said saturable transformer comprises a first pair of windings to which said speed error signal is applied, a second pair of windings to which said temperature error signal is applied, a third pair of windings connected to an alternating current power source, and a fourth pair of windings carrying an output signal from said transformer.

7. A control system for a gas turbine engine comprising a fuel conduit to said engine, a metering valve in said conduit, and means for controlling said valve including means for establishing a reference voltage corresponding to a pre-selected speed, means for establishing a voltage corresponding to actual engine speed, means for establishing a plurality of reference voltages corresponding to a plurality of pre-selected engine temperatures, relay means responsive to said actual speed voltage for selecting a desired temperature reference voltage, means for establishing a voltage corresponding to actual engine temperature, means for producing a speed error signal by combining said speed reference voltage with said actual speed voltage, means for producing a temperature error signal by combining said desired temperature reference voltage with said actual temperature voltage, means producing a signal varying with the rate of change of actual engine temperature and combining said signal with said temperature error signal, a motor for controlling the position of said valve, and means for combining and amplifying said error signals and supplying the resultant signal to said motor.

8. A control system as set forth in claim 7 having means for producing a voltage varying with ambient temperature, and means using said voltage to vary at least one of said temperature reference voltages.

9. A control system for a gas turbine engine comprising a fuel conduit to said engine, a metering valve in said conduit, and means for controlling said valve including means for establishing a reference voltage corresponding to a pre-selected speed, means for establishing a voltage corresponding to actual engine speed, means for establishing a plurality of reference voltages, means responsive to said actual speed voltage for selecting a desired reference voltage, means for establishing a voltage corresponding to actual engine temperature, means for establishing a voltage corresponding to rate of change of actual engine temperature, means for producing a speed error signal by combining said speed reference voltage with said actual speed voltage, means for producing a temperature error signal by combining said desired reference voltage with said actual temperature voltage and said rate of change of temperature voltage, a motor for controlling the position of said valve, and means for combining and amplifying said error signals and supplying the resultant signal to said motor.

10. A control system as set forth in claim 9 having means for producing a voltage varying with ambient temperature, and means using said voltage to vary at least one of said reference voltages.

11. In a fuel control system for a gas turbine engine, a fuel conduit to said engine, a metering valve in said conduit, and means for controlling said metering valve including a tachometer for producing a voltage varying with turbine rotational speed, means producing a speed reference voltage, electrical means producing a speed error signal by comparing said tachometer voltage with said reference voltage, a thermocouple having an output varying with operating temperature, a temperature bridge circuit for creating a voltage varying with ambient temperature, means for establishing a series of electrical reference voltages variable with ambient temperature, means responsive to said tachometer signal for selecting a desired reference voltage, means establishing a voltage corresponding to rate of change of actual engine temperature, comparing means for creating a temperature error signal by comparing said thermocouple voltage with said desired reference voltage and said temperature rate voltage, a saturable transformer in which said speed error and temperature error signals are combined such that an over-temperature signal is always capable of overriding and under-speed signal, and a motor powered by said transformer connected to said metering valve.

12. A coordinated fuel control system for a gas turbine engine comprising an electrical main control unit, a mechanical unit, and an exhaust area control; said main control unit comprising speed sensing means for establishing a signal reflecting actual turbine rotational speed, a throttle, means operated by said throttle establishing a speed reference signal, a speed amplifier in which said signals are combined producing a speed error signal varying in magnitude and phase depending upon the amount and sense of the departure of the speed signal from the reference, temperature sensing means producing a signal reflecting actual turbine operating temperature, means simultaneously producing a plurality of electrical reference signals, means including said speed sensing means, for selecting a desired reference signal, means establishing a signal corresponding to rate of change of actual engine temperature, combining means using said actual operating temperature signal said temperature rate signal and said desired reference signal to create a temperature error signal, and an output stage in which said speed error and temperature error signals are combined; said mechanical unit comprising a fuel conduit to said engine, a metering valve in said conduit, means driven by said output stage for positioning said valve, and means responsive to changes in compressor inlet pressure for varying the head across said valve; and said exhaust area control comprising a temperature limiter system, a hydraulic actuator operated by said throttle and subject to an overriding signal from said temperature limiter, and means movable by said actuator for varying the exhaust area.

13. A fuel control system for a gas turbine engine comprising means producing a first signal proportional to the difference between actual and selected rotational speeds, means producing a second signal proportional to the difference between actual and selected operating temperatures, means for changing said selected operating temperatures with changes in rotational speed and ambient temperature, means producing a third signal varying with rate of change of actual operating temperatures, means for combining said second and third signals and for amplifying said combined signal, a fuel conduit to said engine, a fuel metering valve in said conduit, and means using said amplified combined signal and said first signal to control the operation of said fuel metering valve.

14. A fuel control system as set forth in claim 13 wherein said last named means comprises a saturable transformer having a first pair of windings to which said first signal is applied, a second pair of windings to which said second and third signals are applied, a third pair of windings connected to an alternating current power source, and a fourth pair of windings carrying an output signal from said transformer.

15. A fuel control system for a gas turbine engine comprising a fuel conduit to said engine, a metering valve in said conduit, and means for controlling said metering valve including means for producing a first signal proportional to the difference between the actual and selected values of a first engine operating condition, means producing a second signal proportional to the difference between actual and selected values of the second engine operating condition, means for varying the selected values of said second operating condition with changes in said first operating condition, means producing a third signal varying with rate of change of said second operating condition, means for combining said second and third signals and for amplifying said combined signal, and means using said amplified combined signal and said first signal to control the operation of said fuel metering valve.

16. A mechanism for controlling the fuel supplied to a gas turbine engine comprising a fuel conduit, a metering valve and said conduit, and means for controlling said valve including a first amplifier constituted to have two sources of input signals, one of which reflects actual engine rotational speed, the other of which reflects selected rotational speed, said actual and selected speed signals being used in said amplifier in a manner such that the output of said amplifier varies in magnitude with the magnitude of the difference between said actual and selected speed signals and the polarity of said output is dependent upon whether said actual speed signal is over or under said selected speed signal; and a second amplifier including means for producing a plurality of reference signals and having two sources of input signals for selecting a desired reference, one of which reflects ambient temperature, and another which reflects actual engine rotational speed, and having a third input signal reflecting actual engine operating temperature, and a fourth input signal varying with the rate of change of actual engine operating temperature, said signals being used in said second amplifier in such manner that the output of said second amplifier varies in magnitude with the magnitude of the difference between said desired reference signal and said actual temperature signal and in polarity with the direction of temperature error, a combining amplifier for receiving the output signals from said first and second amplifiers and producing an output signal of its own having a magnitude which varies in accordance with the amplitude and phase of said combined signal and in which an over-temperature signal always overrides an under-speed signal, and electrical means driven by the output of said combining amplifier for positioning said metering valve.

17. In an electrical control system for a gas turbine engine, a fuel conduit to said engine, a metering valve in said conduit, and means for controlling said metering valve including means producing a first signal proportional to the difference between actual and selected values of a first engine operating condition related to power output, means producing a second signal proportional to the difference between actual and selected values of a second engine operating condition related to power output, means producing a signal proportional to rate of change of said second operating condition, means for combining said rate signal with said second signal, an output stage comprising a saturable transformer having a first pair of windings to which said first signal is applied, a second pair of windings to which said second signal is applied, a third pair of windings connected to an alternating current power source, and a fourth pair of windings carrying an output signal from said transformer, and a motor driven by said transformer for controlling the position of said metering valve.

References Cited in the file of this patent

UNITED STATES PATENTS 2,555,544    Holt et al. _____ June 5, 1951

(Other references on following page)

UNITED STATES PATENTS

| | | |
|---|---|---|
| 2,574,438 | Rossi et al. | Nov. 6, 1951 |
| 2,606,420 | Moore | Aug. 12, 1952 |
| 2,623,354 | Best | Dec. 30, 1952 |
| 2,632,996 | Rood | Mar. 31, 1953 |
| 2,648,194 | Jorgensen et al. | Aug. 11, 1953 |
| 2,662,372 | Offner | Dec. 15, 1953 |
| 2,675,674 | Lee | Apr. 20, 1954 |
| 2,705,047 | Williams et al. | Mar. 29, 1955 |
| 2,706,383 | Jacobson | Apr. 19, 1955 |
| 2,734,340 | Wood | Feb. 14, 1956 |
| 2,741,086 | Machlanski | Apr. 10, 1956 |
| 2,762,194 | Kunz et al. | Sept. 11, 1956 |
| 2,764,867 | Farkas | Oct. 2, 1956 |
| 2,786,330 | Brandau | Mar. 26, 1957 |
| 2,790,303 | Kutzler | Apr. 30, 1957 |